June 26, 1928. 1,675,202
W. C. WARNE
METHOD OF MAKING PLASTIC CASTS
Filed Feb. 8, 1926  2 Sheets-Sheet 1
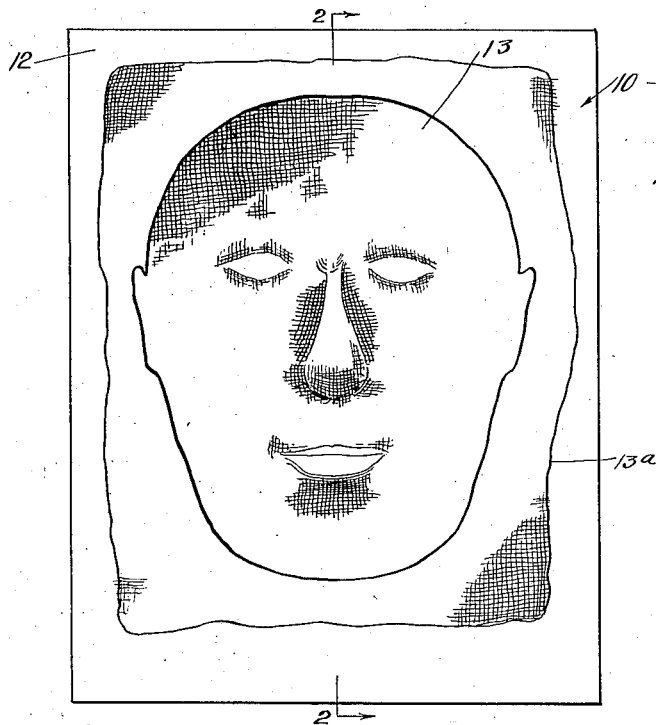
Fig. 1
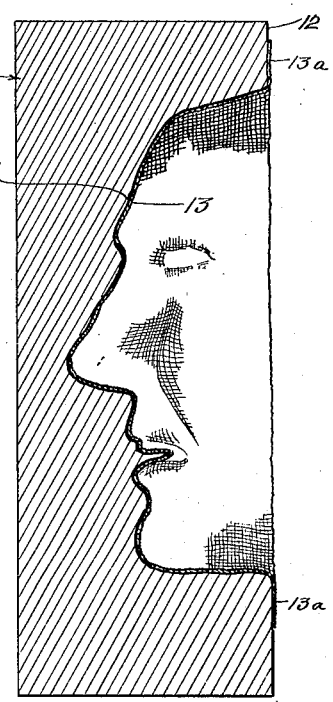
Fig. 2
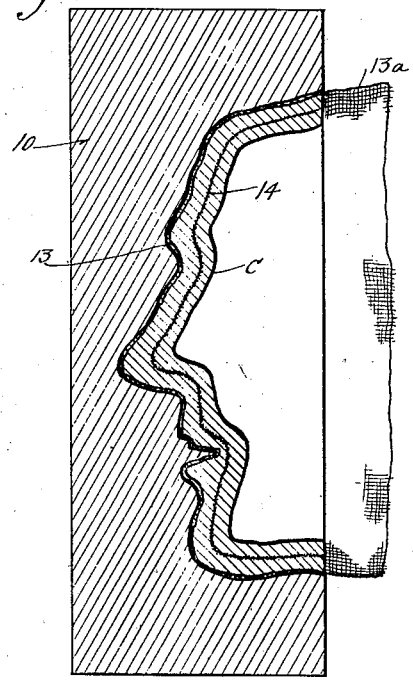
Fig. 3
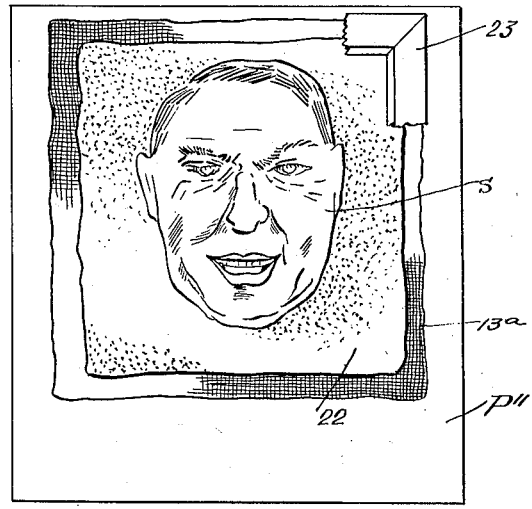
Fig. 8
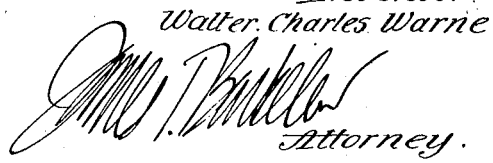
Inventor
Walter Charles Warne.
Attorney.

June 26, 1928.                                               1,675,202
W. C. WARNE
METHOD OF MAKING PLASTIC CASTS
Filed Feb. 8, 1926          2 Sheets-Sheet 2
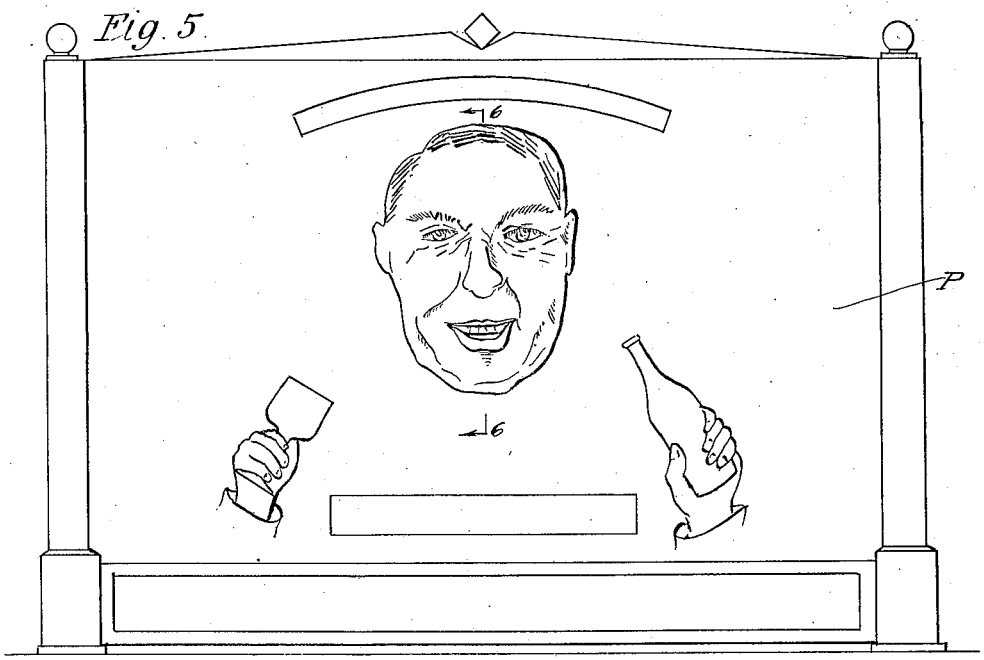
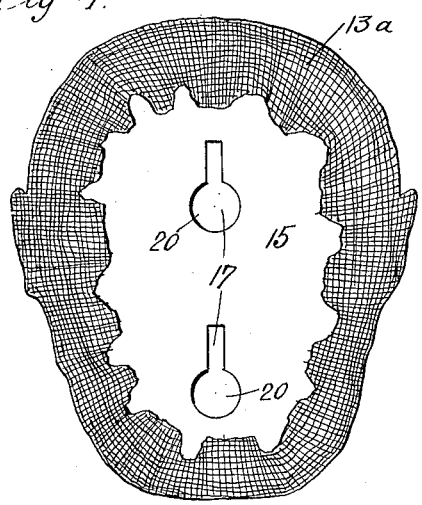
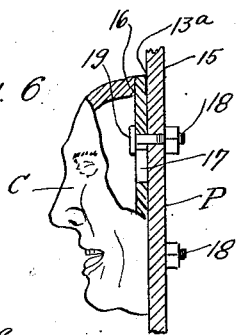
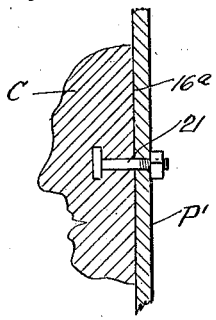
Inventor
Walter Charles Warne.
Attorney.

Patented June 26, 1928.

1,675,202

UNITED STATES PATENT OFFICE.

WALTER CHARLES WARNE, OF LOS ANGELES, CALIFORNIA, ASSIGNOR OF ONE-HALF TO FLAVIUS J. SANDERS, OF LOS ANGELES, CALIFORNIA.

METHOD OF MAKING PLASTIC CASTS.

Application filed February 8, 1926. Serial No. 86,699.

This invention has to do generally with the art of plastic casts, and is more particularly concerned with a novel composition of which plastic casts may be made, a novel method of making plastic casts, and the completed casts themselves, as new articles of manufacture.

Primarily, my invention is concerned with the production of objects having some merit as works of art, either for ornamentation or for commercial use in connection with advertising display. However, the novel method of making the casts and the novel composition of which the cast may be made are also useful in the industrial arts, for such casts have peculiar characteristics which render their use possible in situations where they are subjected to severe shocks or exposed to the weather. Thus, the casts may be substituted for ordinary clay or tile conduits, or the like, in certain situations. Such casts may be tubular or they may be solid. However, since the invention is particularly adaptable to the production of cast reliefs, that is, figures which project with varying degree from a backing surface, I will so describe it, and from this description it will be apparent to those skilled in the art how it may be applied with equal advantage in other situations.

The invention, as applied to relief casts, is not confined to the reproduction of figures having any particular degree of projection, for it may be applied equally well to the production of alto-relievo (high relief) basso-relievo (low relief) mezzo-relievo (intermediate relief) or intaglio relievo (hollow relief). The casts may be produced directly from models, as in the production of intaglio reliefs and life or death masks, or from mold depressions. For the purpose of illustrating the invention, I have shown in the drawings the method of making a high relief cast from a depressed plaster mold, and in the detailed description I have explained a particular manner of mounting such a cast, but this showing and description are merely illustrative in nature and not to be construed as limitative on my broader claims.

Since many of the novel features and objects of the invention may be brought out better in connection with the following detailed description, I will discuss here only briefly a few of the outstanding features.

With regard to the novel composition preferably employed, it is my purpose to produce a quick-setting material which is comparatively cheap and easy to produce and which, in plastic state, is capable of being worked smoothly and of being pressed into molds of comparatively intricate contour so the finer details of designs may be accurately reproduced. Yet the material, when set, is light, strong, fireproof, tough rather than brittle, non-absorbent, non-shrinkable and weather resistant. The advantages of a composition of this nature is self-evident, it being noted that such characteristics are particularly desirable where the cast is exposed to the weather when used for out-door display on bill-boards or the like.

With regard to my novel method, I may briefly describe it as one which enables me to produce accurate, superior casts with comparative rapidity and ease, a feature of very considerable importance from an economic standpoint. A finished cast made in accordance with my invention has about it a fabric sheathing or facing which acts as an external protective cover and reinforcement, binding the entire cast together and preventing it from being chipped, being particularly protective for such portions as project considerably from the main body and have fine lines or prominences of detail. The plastic composition is so pressed into the texture of the cloth that it permanently adheres thereto and may be considered as one therewith. The fabric sheathing not only protects and reinforces the plastic body, but also provides a superficial service which takes particularly well any suitable finishing coat such as paint, lacquer or the like. Furthermore, when my novel composition is used as the plastic body of the cast, the finished cast has, of course, the advantageous features above enumerated in connection with the description of the composition, per se.

I have also devised particularly advantageous means for backing the cast and for applying the cast to a display panel, but these features may be discussed to better advantage in the following detailed description, wherein references are made to the accompanying drawings, in which:

Fig. 1 is a face view of the mold to which a lining cloth has been applied;

Fig. 2 is a section on line 2—2 of Fig. 1;

Fig. 3 is a view similar to Fig. 2 but showing a plastic mass applied to the mold;

Fig. 4 shows a rear view of a cast to which a backing board has been applied;

Fig. 5 shows the cast applied to a billboard or display board;

Fig. 6 is a fragmentary section on line 6—6 of Fig. 5, the cast being shown mainly in side elevation;

Fig. 7 is a sectional view showing a different method of attaching a cast to a display panel; and Fig. 8 is an elevation showing a still different method of attaching a cast to a display panel.

As stated in the foregoing part of this application, I have here chosen to describe a cast made from a mold, though this is not to be construed as limitative on the invention, considered in its broader aspects. I have shown a mold 10 of plaster or the like, made from an original model either by direct casting or by chiseling out the mold. The subject-matter of the cast, of course, is unimportant to the invention, but I have here shown a mold of a man's face, probably one of the most difficult to reproduce faithfully by ordinary methods and yet one which is accurately and quickly reproduced by my method.

Numeral 11 designates the depressed figure of the mold which is sunk in from mold face 12. The surface of the depresser figure is first prepared for the reception of a fabric lining 13, this lining later becoming the facing or sheathing for the cast made from the mold. I regard the use of this fabric lining or facing as one of the chief features of my invention for it has much to do with the ease and quickness with which the casting may be made and handled as well as with the character of a finished cast. First, the fabric is of such a nature that it is adapted to be thrust down with smooth, tight fit into each detail of depression and spread smoothly and tightly over every projection detail so, after the cloth is subsequently backed with a plastic mass and then removed from the mold, the details of the mold figure will be faithfully reproduced in the cast. Second, the cloth provides means whereby the cast may be stripped from the mold rather than adhering in spots thereto. Third, the edges of the fabric lying without the boundary of the depressed figure may be used as handling elements, that is, they provide means whereby the maker may lift the cast from the mold without touching the plastic mass and hence without any danger of mutilating it before it has become finally set. Fourth, the cloth provides an external protective sheathing and reinforcement for the cast. Fifth, it provides means for holding a backing board to the cast or to fix the cast to a display panel. Sixth, it furnishes a superficial surface which is particularly well adapted to take colors, sprays or other suitable surfacing materials.

It is necessary that the fabric used as the lining or facing be of somewhat loose texture so it may readily stretch and take up. With these characteristics, it may be applied smoothly to an uneven surface without wrinkling or puckering, the threads of the fabric shifting relatively to bring about this condition. I find that muslin or cheesecloth, preferably pre-shrunk, is particularly well adapted for the purpose, though any fabric having loose woven characteristics may be substituted. For instance, in making casts of considerable size, I may employ burlap for the purpose.

In applying the fabric to the mold, it is necessary that it adhere closely to every detail of mold contour and thus there is required an adhesive between mold and cloth whereby after a given portion of the cloth is applied to the mold, that portion will remain stuck in position while adjacent portions of the cloth are being applied. Yet, the adhesive must be of such a nature that the cloth may be freed readily from the mold when the cast is being withdrawn. Ordinary mold greases will not suffice, since they have not sufficient adhesive qualities to hold the cloth to the mold during the process of application. I find that beeswax is particularly well adapted to the purpose, this substance providing an adequate adhesive between the mold and cloth and forming a separative film between the mold and cloth having such characteristics that during later stages of the process it readily allows the cloth to be stripped cleanly and easily from the mold, as will hereinafter be made apparent. As a preferred method of applying the beeswax to the mold face, I dissolve the wax in gasoline and apply it with a brush over the mold face. In this manner, it is assured that the wax may be applied to the entire mold face, including the smallest of detail depressions. The gasoline quickly evaporates leaving a film which has superior adhesive qualities.

The fabric is then wetted to make it pliable and workable so it may be thrust down more readily into recess details. Preferably, the fabric is wetted in a flour-water cream, the flour later drying out to form a stiffener and filler for the cloth. The flour-water cream is also somewhat adhesive and therefore aids somewhat in holding the cloth to the mold, though the beeswax primarily is depended upon for this purpose.

In applying the cloth to the mold, it is the usual practice to start approximately at the center of the mold, pressing the cloth firmly down into every recess either by the fingers or with the aid of tools, and then work outwardly until every portion of the mold is lined with close fitting fabric. The wax causes the cloth to adhere closely, holding it from being pulled out of depressions or away from projecting details as the work progresses toward the outer edges of the mold. It may be noted at this point that in the drawings the thickness of the cloth is greatly exaggerated in order that a clear showing may be had, it being understood that in actual practice the fabric will normally be very thin. Preferably, the cloth chosen for application to a given mold is of such extent that after all portions of the depressed figure have been covered, there will be left a marginal strip 13ᵃ of fabric which projects beyond the outline of the mold figure on mold face 12. The purpose of this marginally overhanging fabric will be made apparent later.

The cloth is then allowed to dry out, it becoming, in effect, a stiff fabric shell stuck tightly to every portion of the depressed mold figure so it will not shift when composition is applied thereto.

The cloth lined mold is now ready to receive the plastic mass, the fabric lining being of a nature to take a plastic composition without the latter slipping about during its application. Now, considering those parts of the invention which are concerned with the method of making casts and casts, in general, made by this method, it will be evident that such method and casts are not limited to a plastic mass made up of any particular ingredients. Therefore, those of my claims which are drawn broadly to the method and casts made in accordance therewith are not to be construed as limited to being made up of any particular ingredients. However, I have provided a composition which is particularly well suited to the purpose (this composition being the subject-matter of certain of my claims) and, therefore, I will now specify the ingredients of this particular composition, outlining certain of its advantageous qualities and characteristics, and then proceed with the description of the method.

I will hereinafter specify particular purposes for the various ingredients of my composition, but it is to be understood that the invention, in its broader aspects, is not limited to a composition of materials in the exact proportions here given, though repeated tests have shown these specific proportions to be particularly good. I have here designated an ounce as the unit of measure, and the quantities given are such as will make up a batch suitable for making a cast about the size of a man's face.

20 ounces powdered fire clay;
10 ounces Portland cement;
1 ounce fibrous substance, for instance, asbestos or an equivalent amount of powdered asbestos cement;
5½ ounces powdered resin.

These dry ingredients are mixed thoroughly, and I usually find it desirable, though not necessary, to add 1¼ ounces of powdered sulphur.

I then make a liquid mixture as follows:
6 ounces of alcohol;
2 ounces of water.

The alcohol and water are then added to the dry ingredients and mixed to a rather thick consistency or until the mass is readily workable, that is, until it is about as stiff as putty.

I will now outline the particular function and characteristics of each of the above ingredients. The clay, cement and fibre go to make up the body of the composition, the clay and cement combining with the water to form a very fine, hard concrete, and they may, therefore, be considered as hardeners. The cement is much finer than the clay, and therefore acts as an interstitial filler for both the clay and fabric. The cement both gives added strength to the body and gives a comparatively smooth finish thereto. The fibrous material renders the body tough rather than brittle, and during the formative stages of the cast holds the body together so it is flexible or pliable. While any suitable fibrous material may be used, I find powdered asbestos particularly well adapted for the purpose, since it is light, non-absorbent and non-inflammable.

The resin is dissolved in the alcohol and spreads through the mass to form a binder for the other ingredients. When sulphur is used, it melts during the subsequent application of heat to the cast and becomes distributed throughout the mass to aid the resin in binding the ingredients together. While the sulphur is desirable when it is wished to obtain a particularly hard cast, it may be dispensed with in certain situations. The alcohol, in addition to dissolving the resin and therefore causing its distribution, tends to dry out the cast rapidly, a feature of importance especially when a given mold is to be used for the successive production of casts. The water, of course, goes to the clay and cement, setting up the cement and subsequently drying out of the clay. It is desirable that no more water be used than is actually needed.

The plastic mass is pressed into the mold and against the cloth lining 13 either directly by finger pressure or with the use of tools, the composition being of such a nature that it is forced readily into all depression details, and into the interstices of the lining, thus in effect, pressing the cloth firmly into the plastic mass so, thereafter, the plastic mass and cloth may be considered as an entity. Especially where the cast is to be of considerable size, I may introduce an internal reinforcing member in the form of fabric 14 of wire mesh, or the like, such material being particularly well suited to the purpose inasmuch as it may be bent to follow the general outline of the mold contour. The reinforcement is pressed into the plastic mass C and then more of the plastic composition is spread over the reinforcement until the thickness of the cast is of that degree desired, though for smaller casts, I find it unnecessary to provide internal reinforcement. The mold may be filled entirely with the plastic composition, though ordinarily I find it necessary only to spread the composition in sufficient thickness to form a comparatively thin shell S for, due to the peculiar nature of the composition, its inherent strength is so great that it need have but comparatively little mass to withstand extreme shock.

The mold is now heated, the cement immediately starting to set, (the composition having comparatively quick setting characteristics) and the water to dry out, the drying action being hastened, without causing shrinkage of the cast, due to the presence of alcohol. The drying is preferably done in an oven having a temperature ranging around 100° Fahrenheit. The mold may be left in the oven until the cast is in its finished, hardened state, or it may be withdrawn after it has dried out and set to such an extent that there is no danger of it being mutilated under careful handling, though still somewhat soft and flexible, the overhanging fabric 13ª being grasped as a handhold whereby the cast is stripped from the mold, the heat having previously softened or melted the beeswax so that the fabric comes clear from the mold face without difficulty. The cast may then be inspected for deformations and then returned to the mold for further drying and setting. If it is found upon the first removal of the cast that the plastic material has not been thrust down deeply enough into certain details, the composition is still in a sufficiently soft state to be pressed down correctively upon its re-introduction to the mold. Before this reintroduction, however, it is preferable that the inner face of the mold be sprinkled with talcum powder which forms a separative film between mold and cast so the beeswax left on the mold face may not cause adherence between the mold and cast. The cast is then allowed to dry until it has sufficient set and then removed from the mold by pulling on fabric over-hang 13ª, the mold then being ready for the next cast. It has been found in actual practice that it requires only about thirty minutes in an oven of about 100° Fahrenheit to harden the cast sufficiently to allow its final withdrawal, so it will be seen that the time element is comparatively short and, therefore, of great advantage.

The finished casts may be considered as a plastic shell, sometimes internally reinforced, which has upon its outer face a protective sheathing and reinforcement of fabric, the fabric and composition being pressed together to such a degree that they may be considered as one. The sheathing not only reinforces the cast generally and practically eliminates the chance of external prominences, even of the finest details, from being chipped or broken off, but also provides a very superior surface for the reception of paint or any other suitable finishing substance. Preferably, before the paint or final finishing material is used, the cast is shellacked.

Due to the nature of the composition, the cast is strong, light, tough, non-absorbent, and non-inflammable. It is, therefore, adapted to be used in a great many situations where the use of an ordinary plaster cast or the like is entirely unfeasible. For instance, the cast may be exposed to the weather or be used in situations where it is exposed to considerable abuse.

I may mount the cast or shell S on a backing or display panel in any suitable manner, though I have shown and will now describe a preferred method. First, I will describe a method which may be employed with particular advantage where the cast is to be attached removably to a display panel, for instance, a bill-board. First, a backing piece 15, of wood, heavy card-board or any suitable material, is cut to fit and placed against the rearwardly disposed marginal faces or base edges 16 of the cast, as shown in Figs. 4 and 6. The marginal over-hangs 13ª of fabric facing 13 are then brought over the edges of backing 15 and cemented against the outer face thereof, thus securely binding the backing board to the cast. Board 15 then becomes not only a reinforcing backing for the cast but also provides means whereby the cast may be attached to a display panel such as bill-board P, it being readily understood that bolts or other fastening devices may be passed through board 15 and panel P to secure them together. Preferably, the attaching means is such that the cast may be easily applied to or disconnected from the panel. To this end, I have provided board 15 with bayonet slots 17 adapted to receive bolts 18 which are supported in panel P. It will be evident how bolts 18 are used to clamp board 15 and panel P together and how they may be loosened to allow the cast to be shifted relative to the panel until enlarged bolt heads 19 are in line with bayonet slot enlargements 20 so the cast may be pulled horizontally clear of the panel. Of course, where a cast C (Fig. 7) is of sufficient thickness, an anchoring bolt 21 may be set into the body of the casting during its formation, said bolt 21 being adapted to extend from the rearward face 16ª of the cast to provide means for attaching it to a supporting member P′.

In certain instances I apply the cast directly to a display panel in which situation I lay the cast with its rearward edges 16 directly upon panel P″. Overhanging marginal fabric flanges 13ª are then stretched outwardly from the cast and on top the panel, being glued or otherwise suitably fastened to said panel to hold the cast thereto, as shown in Fig. 8. Then, if desired, a quantity of my improved composition, or any other finishing substance may be spread over fabric 13ª as at 22, and then surfaced or decorated in any manner chosen. A border frame 23 may outline the composition facing 22.

It will be understood the drawings and description are to be considered merely as illustrative of and not restrictive on the broader claims appended hereto, for various changes in design, structure and arrangement may be made without departing from the spirt and scope of said claims.

I claim:

1. The method of forming plastic casts from a mold that includes applying an adhesive to the mold, lining the mold with a loose woven fabric, pressing the fabric onto the adhesive so the mold and fabric are stuck together, backing the lining with a moist plastic composition, pressing the composition into the fabric to cause it to adhere thereto, heating the mold to soften the adhesive and at least partially dry the composition, and withdrawing the fabric and composition, as one, from the mold.

2. The method of forming plastic casts from a mold that includes applying beeswax to the mold, lining the mold with a loose woven fabric, pressing the fabric onto the beeswax so the mold and fabric are stuck together, backing the lining with a moist plastic composition, pressing the composition into the fabric to cause it to adhere thereto, heating the mold to soften the beeswax and at least partially dry the composition, and withdrawing the fabric and composition, as one, from the mold.

3. The method of forming plastic casts from a mold that includes applying beeswax in a quickly evaporated solvent, to the mold, allowing the solvent to evaporate, lining the mold with a loose woven fabric, pressing the fabric onto the beeswax so the mold and fabric are stuck together, backing the lining with a moist plastic composition, pressing the composition into the fabric to cause it to adhere thereto, heating the mold to soften the beeswax and at least partially dry the composition, and withdrawing the fabric and composition, as one, from the mold.

4. The method of forming plastic casts from a mold that includes applying an adhesive to the mold, lining the mold with a loose woven fabric, pressing the fabric onto the adhesive so the mold and fabric are stuck together, backing the lining with a moist plastic composition, pressing the composition into the fabric to cause it to adhere thereto, heating the mold to soften the adhesive and partially dry the composition, withdrawing the fabric and composition, as one, from the mold, dusting the mold with powder, reinserting the cast in the mold, pressing it firmly back thereinto, drying the composition and again withdrawing the fabric and composition, as one.

5. The method of forming plastic casts from a mold that includes lining the mold with a loose woven fabric wet in a flour-water cream, drying out the fabric, backing the lining with a moist plastic composition, pressing the composition, into the fabric to cause it to adhere thereto, at least partially drying the composition, and withdrawing the fabric and composition, as one, from the mold.

6. The method of forming plastic casts from a mold that includes lining the mold with a wet, loose-woven fabric, at least partially drying out the fabric, backing the lining with a moist plastic composition, pressing the composition into the fabric to cause it to adhere thereto, at least partially drying the composition, and withdrawing the fabric and composition, as one, from the mold.

7. The method of forming plastic casts from a mold that includes applying an adhesive to the mold, lining the mold with a wet, loose-wooven fabric, pressing the fabric onto the adhesive so the mold and fabric are stuck together, at least partially drying out the fabric, backing the lining with a moist plastic composition, pressing the composition into the fabric to cause it to adhere thereto, heating the mold to soften the adhesive and at least partially to dry the composition, and withdrawing the fabric and composition, as one, from the mold.

In witness that I claim the foregoing I have hereunto subscribed my name this 13th day of January 1926.

WALTER CHARLES WARNE.